Charles Paddock's Improved Lock for Thimble Skeins
No. 120,092. Patented Oct. 17, 1871.
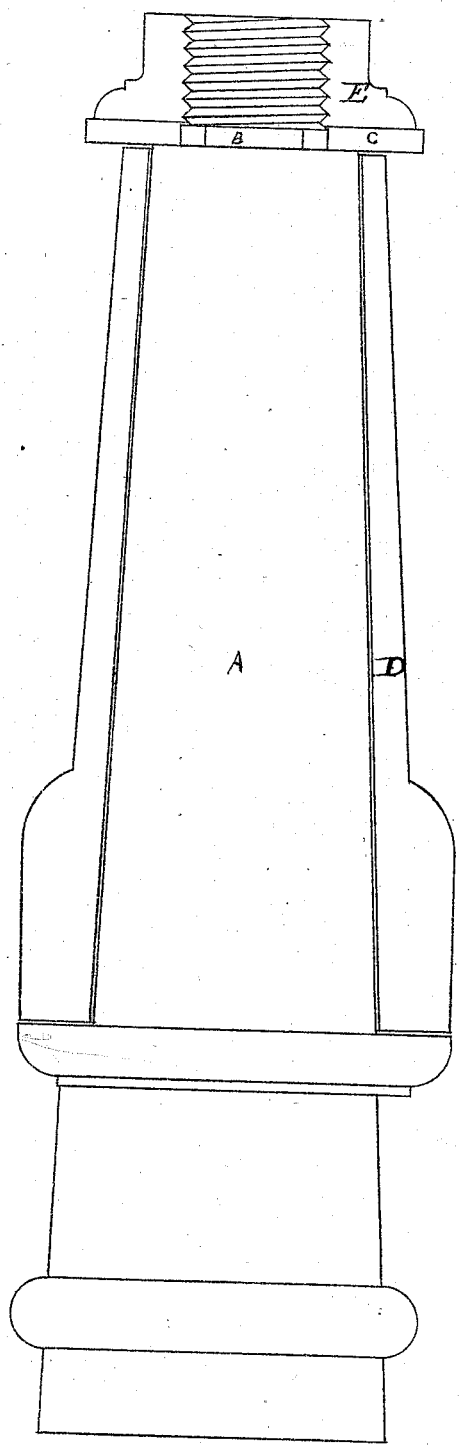
Fig I
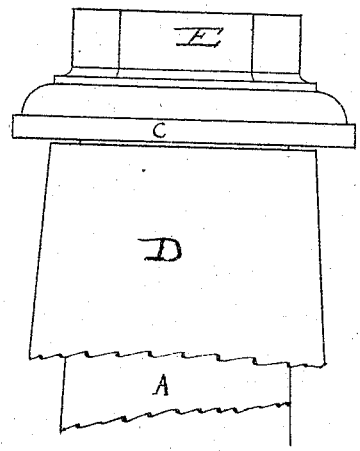
Fig. II
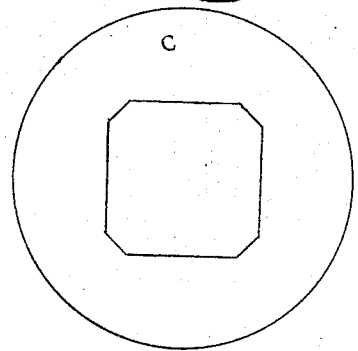
Fig. III
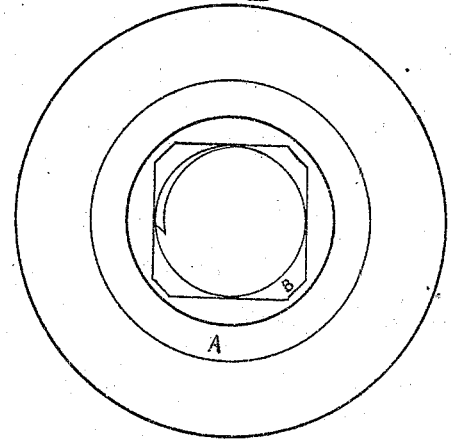
Fig IV.
Witnesses
Charles. A. Andres.
Frederick Dolbracht
Inventor
Charles Paddock

UNITED STATES PATENT OFFICE.

CHARLES PADDOCK, OF ALTON, ILLINOIS.

IMPROVEMENT IN THIMBLE-SKEINS.

Specification forming part of Letters Patent No. 120,092, dated October 17, 1871.

*To all whom it may concern:*

Be it known that I, CHARLES PADDOCK, of Alton, in the county of Madison and State of Illinois, have invented certain Improvements in Thimble-Skeins, of which the following is a specification:

My invention consists of an octagonal washer, together with an octagonal shoulder upon the end of the skein to which the washer is fitted. By means of this device the thimble and nut at end of skein are separated by a washer which cannot revolve, and which is, as it were, a part of the skein itself.

In the accompanying drawing, Figure 1 is a sectional view of the thimble-nut and washer in position with reference to the skein. Fig. 2 is an exterior view of the same. Fig. 3 is a top view of the octagonal washer. Fig. 4 is a top view of the octagonal shoulder upon the skein.

A is the skein. B is the octagonal shoulder upon the same. C is the octagonal washer. D is the thimble. E is the nut.

Similar letters of reference indicate similar parts of the invention.

The washer C being fitted over the octagonal shoulder B upon the skein, the washer is immovably fixed thereto. The revolving of the thimble D upon the skein A because of the interposition of the octagonal washer C can impart no jarring or loosening motion to the nut E. The prevention of this loosening of the nut, obviously of great importance, is, it is apparent, effectually accomplished by my invention, which has this result for its object.

I claim as my invention—

The octagonal shoulder B upon the end of the skein and the octagonal washer C, and their use together as described, for the purposes herein specified.

CHAS. PADDOCK.

Witnesses:
    F. VALBRACHT,
    C. A. ANDREY.

(31)